Figure 1:
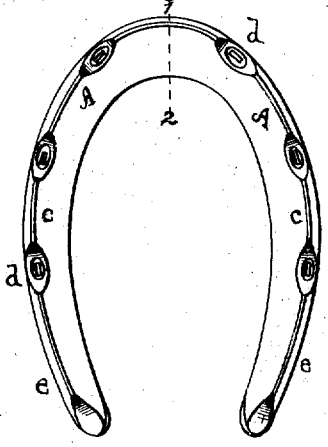

R. A. GOODENOUGH.

Horseshoes.

No. 6,072. Reissued Sept. 29, 1874.

Witnesses.
A. H. Norris.
Geo. W. Cushing

Inventor:
Rollin A. Goodenough.
By his Attorney—
James L. Norris.

THE GRAPHIC CO. PHOTO-LITH. 39 & 41 PARK PLACE, N.Y.

UNITED STATES PATENT OFFICE.

ROLLIN A. GOODENOUGH, OF NEW YORK, N. Y.

IMPROVEMENT IN HORSESHOES.

Specification forming part of Letters Patent No. 28,469, dated May 29, 1860; extended seven years; reissue No. 6,072, dated September 29, 1874; application filed August 3, 1874.

*To all whom it may concern:*

Be it known that I, ROLLIN A. GOODENOUGH, of New York, in the county of New York and State of New York, have invented certain new and useful Improvements in Shoes for Horses and other Hoofed Animals, of which the following is a specification:

My invention relates to a new and improved shoe for horses and other hoofed animals, by means of which the shell or wall will be fully protected by the iron, leaving the sole and frog untouched, so that the frog may come in contact with the ground, and the frog and sole perform their natural functions. The only portion of the foot of a sound horse which it is necessary to protect is the crust or wall, and the least possible iron to do this perfectly should be employed. This iron should in no way interfere with or touch the frog of the foot, which is designed by nature to bear the whole weight of the animal, and give elasticity to the foot to protect the legs and shoulders in slipping. In the ordinary flat shoes, as heretofore constructed, a large amount of useless metal is employed, and the shoe is necessarily of such a shape as to require the frog and sole to be trimmed or rasped in order that the shoe may be properly fitted to the hoof, or to make it necessary to burn the shoe on, which injures both the frog and the sole. Besides, a shoe of such construction prevents the frog of the hoof from coming in contact with the ground, throwing the whole weight of the animal upon the crust or wall of the hoof, causing the same to split or crack, and giving rise to various diseases of the interior part of the hoof, occasioned by depriving those parts of their natural functions or offices. All horseshoes require to be made sufficiently heavy to give proper service, but as the only part of the hoof requiring protection is the shell or crust the metal should be thickened directly under that portion, and not distributed under other parts of the hoof. To this end I construct my improved shoe with an indented ridge composed of a series of short ridges, separated by a series of perforations on the under side, and beveled off from the outer to the inner edges of the lower side, so as to form a narrow ridge directly under the shell or crust of the hoof and perfectly protect the same. The inner edge of the upper side of the shoe I bevel off from the bearing-surface to the inner edge, so that the metal will not come in contact with the frog or sole when the shoe is in place, and will not interfere with the shedding and renewal of the same, and other natural functions of the interior portion of the hoof. The perforated depressions on the under side of the shoe receive the nails, by which it is attached to the hoof, and protect the heads, preventing the same from being broken off or injured by wear. In a shoe as thus constructed the indented ridge, which extends around the shoe immediately under the shell, distributes the blow in stepping to the whole crust or shell instead of three points only, as the ordinary triple cork shoe does; and it also prevents slipping, affords a stable support for the horses, and does not permit the foot to rock sidewise. The perforated indentations permit the nails to be applied with facility by the smith at points sufficiently near the rim of the shoe to enter properly into the crust of the hoof, and at the same time each depression furnishes a socket which receives the nail-head, so that the latter is protected from being broken off by the more protuberant portions of the adjacent ridge. The shoe as thus formed will have a double beveled edge, the lower bevel forming the edge for giving strength to the shoe, and protecting the shell or crust of the hoof, the bevel on the upper side carrying the metal away from the frog and sole, and allowing them to perform their natural functions, as before stated.

Figure 11:
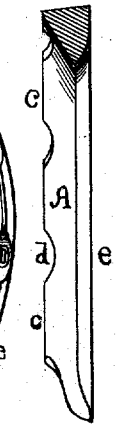
Figure 2:
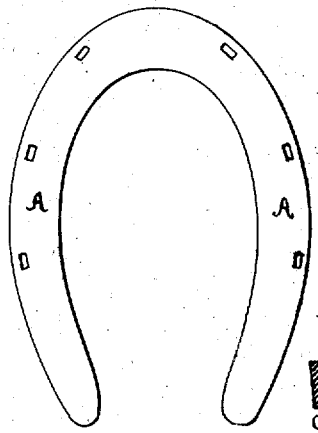
Figure 3:
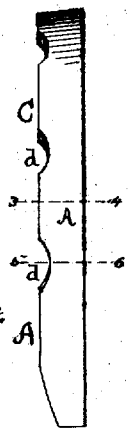
Figure 4:
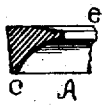
Figure 5:
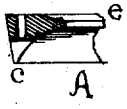

In the drawings, Figure 1 represents a view of the under side of my improved horse-shoe in its most simple form. Fig. 2 is a view of the upper side of the same. Fig. 3 is a side view of the same. Figs. 4 and 5 represent cross-sections of the shoe at the lines *x x* and and *y y* of Fig. 3. Figs. 6, 7, 8, 9, and 10 represent various views of two horseshoes embodying my invention in a more definite form, and Fig. 11 represents a sectional view of the shoe, showing more clearly the double beveled edge of the same.

Several shoes constructed upon the principle of my invention are represented.

Figure 6:
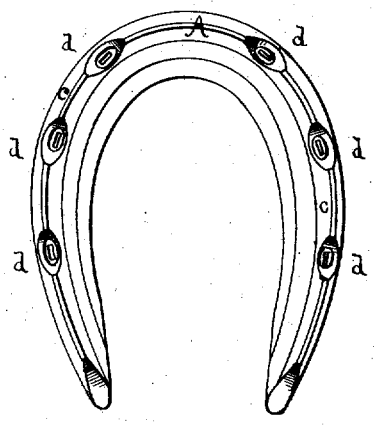
Figure 9:
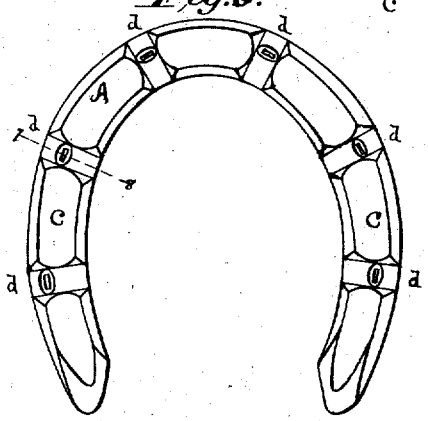
Figure 8:
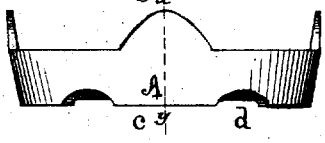
Figure 7:
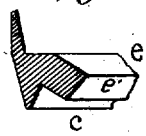
Figure 10:
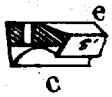

In the shoe represented at Figs. 1, 2, 3, 4 and 5 the indented ridge A consists of a series of short ridges, *c c*, alternating with depressions *d*, and the latter are perforated to receive the nails. In the shoe shown at Figs. 6, 7, and 8 the indented ridge formed by the level on the under side is combined with a continuous inner ridge, and in that shown at Figs. 9 and 10 it is combined with a second indented ridge on the inner rim of the shoe. These two modifications afford increased security to the horse, and show that the invention may be embodied in modified forms. The shoe shown at Figs. 6, 7, and 8 is fitted upon its upper side with clips *g*, which take the lateral strain from the nails. This addition is frequently made by the smith to ordinary shoes, and may be applied with advantage to all shoes of my construction. The shoes thus described may be formed of wrought metal or may be cast, and they may be made of malleable iron or hard brass. They may be formed with more or less depressions, according to the number of the nails required to hold the shoe, and the edges may be made more or less sharp, as may be deemed expedient, according to the nature of the ground over which the animal is to be used.

In the drawings the main or indented ridge is represented by the letter A, and consists of a series of short ridges, represented by *c c*, alternating with depressions *d*, which are perforated, as shown, to receive the nails. The ridge A is formed by beveling the shoe from one or both edges of the under side, as shown. The bevel on the upper side of the shoe is represented by the letter *e*, and extends from the inner edge of the shoe toward the outer edge of the same, and may be at any desired angle, although I prefer about the angle shown in the drawings. The bevels on each side extend entirely around the shoe. The shoe is sloped off toward the ends or heel, so as to come to a point, as shown.

The shoe is applied by cutting a level seating around the bottom of the crust or shell of the hoof, just the width of the web of a new shoe, with a knife or rasp, care being taken not to touch or injure the frog or sole of the foot, rasping or cutting gradually from the toe to the heel of the foot, so as to allow the frog to reach the ground when shod. The shoe is then fitted to follow the sweep of the crust or shell, taking care that no iron projects beyond the crust or wall at the heel, leaving the shoe long enough to cover the entire length of the foot and no more. The shoe is intended to be applied cold, no burning of the hoof being required, all that is necessary being to pare or rasp the seating until the shoe bears all around the crust.

What I claim as my invention, and desire to secure by Letters Patent, is—

1. A shoe for horses and other hoofed animals, having upon its under side an indented ridge, as herein described, perforated for the insertion of nails at the rim of the shoe.

2. A horseshoe having a flat upper surface extending partly across the web of the shoe to sustain the crust of the hoof, said web being beveled, as shown at *e*, to prevent contact with the sole of the foot, and having the lower or tread surface beveled or cut away, as shown at *e'*, said surfaces and bevels extending the entire length of the shoe, substantially as set forth.

In testimony that I claim the foregoing I hereunto set my hand in the presence of two witnesses.

ROLLIN A. GOODENOUGH.

Witnesses:

JAMES ALLEN,

CHARLES W. RUSSELL.